United States Patent
Vardon

(10) Patent No.: US 11,830,071 B1
(45) Date of Patent: Nov. 28, 2023

(54) CUSTOMER FACING RISK RATIO

(71) Applicant: WELLS FARGO BANK, N.A., San Francisco, CA (US)

(72) Inventor: Jordan D. Vardon, Matthews, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/498,041

(22) Filed: Oct. 11, 2021

Related U.S. Application Data

(63) Continuation of application No. 16/700,405, filed on Dec. 2, 2019, now Pat. No. 11,182,855, which is a continuation of application No. 15/159,916, filed on May 20, 2016, now Pat. No. 10,497,058.

(51) Int. Cl.
   *G06Q 40/04* (2012.01)

(52) U.S. Cl.
   CPC .................................. *G06Q 40/04* (2013.01)

(58) Field of Classification Search
   CPC ...................................................... G06Q 40/04
   USPC ...................................................... 705/3–44
   See application file for complete search history.

(56) References Cited

U.S. PATENT DOCUMENTS

| | | | |
|---|---|---|---|
| 6,412,691 B1 | 7/2002 | Shiobara et al. | |
| 7,110,973 B1 | 9/2006 | Goldstein et al. | |
| 7,657,474 B1 | 2/2010 | Dybala et al. | |
| 7,897,126 B2 | 3/2011 | Rappas et al. | |
| 7,953,652 B1* | 5/2011 | Hurewitz | G06Q 40/12 705/30 |
| 8,195,521 B1 | 6/2012 | Goldstein et al. | |
| 8,332,307 B1* | 12/2012 | Gastineau | G06Q 40/04 705/37 |
| 8,370,234 B2 | 2/2013 | Gershon | |
| 8,615,462 B2 | 12/2013 | Glodjo et al. | |
| 8,732,051 B2 | 5/2014 | Gershon | |
| 8,768,807 B2 | 7/2014 | Horsfall | |
| 8,849,712 B2 | 9/2014 | Nyhoff et al. | |
| 10,949,842 B1* | 3/2021 | Lee | G06Q 20/388 |
| 2002/0147670 A1* | 10/2002 | Lange | G06Q 30/08 705/37 |
| 2002/0184141 A1* | 12/2002 | Stein | G06Q 40/08 705/38 |

(Continued)

OTHER PUBLICATIONS

Savona et al., "On Monetary Analysis of Derivatives", LUISS Guido Carli University and Guido Carli Association, Rome, JFL Classification No. E51, E58, F34 (Year: 2000).*

(Continued)

*Primary Examiner* — Frantzy Poinvil
(74) *Attorney, Agent, or Firm* — Kilpatrick Townsend & Stockton LLP

(57) ABSTRACT

Provided is a customer facing risk ratio for trading desks that deal primarily in derivatives in order to determine conformance with government regulations as it relates to financial entities. The customer facing risk ratio is a metric that measures customer facing risk exposure for trading desks of the financial entity. The metric may be utilized to determine conformance to various regulations as it relates to derivative transactions. The customer facing risk ratio may be utilized to measure the proportion of customer facing risk exposure compared to the total risk exposure for each trading desk of a financial entity.

20 Claims, 9 Drawing Sheets

(56) References Cited

U.S. PATENT DOCUMENTS

| | | | |
|---|---|---|---|
| 2003/0069826 A1* | 4/2003 | Guidi | G06Q 40/00 705/37 |
| 2003/0115128 A1* | 6/2003 | Lange | G06Q 40/04 705/37 |
| 2003/0236738 A1 | 12/2003 | Lange et al. | |
| 2006/0277305 A1* | 12/2006 | Bernardin | G06Q 10/06 709/226 |
| 2008/0103961 A1* | 5/2008 | Ramani | G06Q 40/03 705/38 |
| 2009/0012892 A1* | 1/2009 | Biase | G06Q 40/04 705/37 |
| 2009/0020751 A1 | 1/2009 | Seki et al. | |
| 2009/0030756 A1 | 1/2009 | Riley et al. | |
| 2009/0276257 A1 | 11/2009 | Draper et al. | |
| 2012/0041865 A1 | 2/2012 | Glodjo et al. | |
| 2013/0006835 A1 | 1/2013 | Gershon | |
| 2014/0019340 A1 | 1/2014 | Ruder et al. | |
| 2014/0129419 A1 | 5/2014 | Horsfall | |
| 2014/0136387 A1 | 5/2014 | Gershon | |
| 2014/0372319 A1 | 12/2014 | Wolovitz | |
| 2015/0106251 A1 | 4/2015 | Farnstrom | |
| 2016/0048916 A1 | 2/2016 | Glodjo et al. | |
| 2016/0078539 A1 | 3/2016 | Ignatovich et al. | |

OTHER PUBLICATIONS

Siems, Thomas F., Financial derivatives: Are new regulations Warranted ?, Financial Industry Studies : 1., Federal Reserve Bank of Dallas, August (Year: 1994).*

Evans , "Squeezing Every Last Drop", Creditmag.com, Restrictions on Bank Proprietary Trading Have Caused Liquidity to Fall in Both the Cash and Credit Derivatives Markets, Forcing Investors to Adopt to Alternative Strategies, Nov. 2010, 5 pages.

Huseman , "An Elementary Formula Creates Long-Term Success", National Mortgage News, ProQuest Doc.Id. 1559085270, vol. 38, No. 48, Sep. 1, 2014, pp. 1-35.

* cited by examiner

CUSTOMER FACING RISK RATIO

CROSS REFERENCE TO RELATED APPLICATIONS

This application is a continuation and claims the benefit of U.S. patent application Ser. No. 16/700,405 filed Dec. 2, 2019, now issued U.S. Pat. No. 11,182,855, which is a continuation and claims the benefit of U.S. patent application Ser. No. 15/159,916, filed May 20, 2016, now issued U.S. Pat. No. 10,497,058, the entireties of both of which are incorporated herein by reference.

BACKGROUND

The Volcker Rule was implemented to restrict United States banks from engaging in certain speculative investments that do not benefit customers of the bank. The rule is sometimes referred to as a ban on proprietary trading (also known as "prop trade") by commercial banks and the use of deposits to trade on the bank's own accounts (e.g., the bank cannot take its own money and invest/trade with that money). A derivative is a contract that derives its value form the performance of the underlying entity. In the case of derivatives, it may be difficult to monitor the status of prop trades and, therefore, it may be difficult to effectively monitor conformance with the Volcker Rule for trading desks that primarily deal with derivatives.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to a customer facing risk ratio, which is a metric that measures customer facing risk exposure for trading desks that primarily transact in derivatives. A purpose of the customer facing risk ratio is to create a metric that may be utilized by financial entities to determine conformance to the Volcker Rule or similar rules.

An aspect relates to a system that includes a processor and a memory that stores executable instructions that, when executed by the processor, facilitate performance of operations. The operations may include determining a risk driver for a financial desk that deals in derivatives. The financial desk is selected from a group of financial desks associated with a financial entity. The operations may also include determining a ratio of transactions processed by the financial desk based in part on the risk driver and a comparison between customer-facing transactions and non-customer-facing transactions. Further, the operations may include outputting a representation of the ratio of transactions as compared to another representation that is based on a trade count or a notional value.

Another aspect relates to a method that may include determining, by a system comprising a processor, a primary purpose of a trading desk that handles the marketing of securities. The trading desk may be selected from a set of trading desks associated with a financial entity. The method may also include determining, by the system, a quantity of customer-facing transactions conducted by the trading desk and another quantity of non-customer-facing transactions conducted by the trading desk. Further, the method may include determining, by the system, a ratio between the quantity of customer-facing transactions and the other quantity of non-customer-facing transactions. The ratio may be based in part on a risk sensitivity level that is a function of the primary purpose of the trading desk. The method may also include outputting, by the system, the ratio for the trading desk at about the same time as another ratio related to a trade count or a nominal value for the trading desk are output.

A further aspect relates to a computer-readable storage device that stores executable instructions that, in response to execution, cause a system comprising a processor to perform operations. The operations may include determining a risk sensitivity level for a financial desk of a financial entity. The financial desk may have a primary purpose of marketing of derivatives. The operations may also include determining a customer-facing risk ratio for the financial desk based on a comparison between a risk attributable to customer transactions and a total financial exposure. Further the operations may include providing a representation of the customer-facing risk ratio that is visually overlaid with a customer-facing trade ratio. According to an implementation, the operations may include continuing to monitor the risk sensitivity levels for the financial desk based on a determination that the customer-facing risk ratio is above a threshold level. In an alternative implementation, the operations may include outputting an alert based on another determination that the customer-facing risk ratio is below the threshold level.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
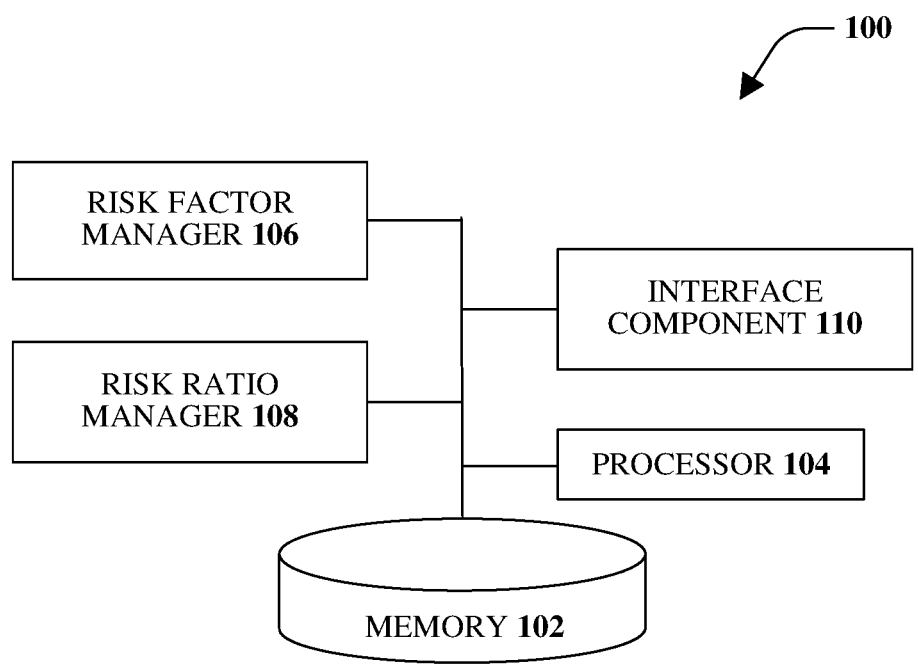
FIG. 1 illustrates an example, non-limiting system configured to evaluate customer facing risk ratio performance, according to an aspect.

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

The Volcker Rule has been implemented for all financial entities in the United States of America. The main focus of the Volcker Rule is the premise that financial entities cannot prop trade (e.g., a financial entity cannot take its own money and invest/trade that money) because such trading would endanger the health of the financial entity, which would endanger the financial systems.

As used herein an "entity" or "financial entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution.

Although the Volcker Rule is written such that it is illegal for a financial entity to prop trade, it is legal for the financial entity to perform other actions, such as making markets in securities (e.g., covered instruments) on behalf of its customers (e.g., customer facilitation). There is an exception to Volcker Rule referred to as the market making exception. According to this exception, the decisions related to the Volcker Rule should be performed by a trading desk. As defined, a "trading desk" is the smallest discrete unit of organization of a financial entity that purchases or sells financial instruments for the trading account of the financial entity.

For the trading desks that rely upon the market making exceptions, the financial entity should show that the primary purpose of those desks is customer facilitation (e.g., solely exist for the purpose of making markets and the desks are not prop trading). An underlying presumption is that a trade with the customer is not a prop trade. Thus, if a trade is made with a customer, by regulatory fiat that trade cannot be a prop trade because it is not the financial entity taking its own money and dealing with another very large financial entity solely to make money on that trade. By definition, it has to be a customer facilitation trade. This is a distinction for trading desks relying on the market making exception to make sure the desk is performing customer facilitation to be in conformance with the Volcker Rule.

In order to assist a financial entity to determine how effectively its market making desks are customer facing, the regulators have established metrics, referred to as Customer Facing Trade Ratio (CFTR). The CFTR is a regulatory requirement and each financial entity provides a ratio for each of its Volcker trading desks. The ratio attempts to quantify the activity the desk is doing with customers in different ways, such as trade counts and notional values.

Trade counts are the number of trades with customers as compared to the number of trades with a non-customer. In an example, there may be ten trades with customers, each having a value of one million dollars ($1,000,000), and a single trade of one billion dollars ($1,000,000,000) with a non-customer. From the perspective of the CFTR, the trade count ratio looks good because it appears that the trade count between customers and non-customers is ten to one. However, the one billion dollar trade with the non-customer dwarfs the size of the other smaller trades with the customers. Thus, the trade count is ineffective to show how successfully a trading desk is customer facing.

A notional value is the dollar amount of the trade. For example, a one billion dollar ($1,000,000,000) interest rate swap would have a one billion dollar ($1,000,000,000) notional value. Another aspect of CFTR is that the calculation evaluates the notional values of customer facing trades versus the notional values of non-customer facing trades to produce a metric. This metric indicates whether the particular trading desk being reviewed is meeting regulations and may continue to exist as a trading desk.

These two ways of examining the customer facing decision (e.g., the trade count and the notional value) do not seem to work well for trading desks whose primary purpose is the marketing of derivatives. In an analogy, using CFTR to determine whether or not a derivatives desk is facing customers effectively is similar to attempting to determine the temperature by looking at what people are wearing. Although clothing may provide an idea of the temperature, there are more precise ways to make the determination. That more precise way for the derivatives desk is referred to as their primary risk factor sensitivity as provided herein.

Each of the different derivatives desks has a different measuring stick that it uses to measure its risk. For example, an interest rate swap is where a financial entity pays a fixed percentage on an agreed upon notional value with a customer and the financial entity will receive a floating interest rate percentage with that agreed upon customer at the same notional amount. Using the standard CFTR for this interest rate desk and a one billion dollar interest rate swap where the financial entity is paying the customer a six percent fixed rate versus a one billion dollar notional trade where the financial entity is paying the customer a three percent fixed interest rate, those desks will look at in very different ways. The risk is much higher to the desk on the six percent swap versus the three percent swap. However, by using the CFTR measurement to determine how effectively the desks are customer facing, those two swaps would look exactly the same since the notional value is the same on both trades.

In a real-world example, the financial entity (e.g., one of its trading desks) could face a non-customer on a one billion dollar, six percent fixed swap and could face a customer on a one billion dollar, three percent fixed swap and according to CFTR, those two swaps cancel each other out perfectly and it looks as if the trading desk has a one-to-one (1:1) ratio for customer-facing vs. non-customer-facing. However, in reality the trading desk is effectively facing a non-customer (which is being paid a six percent fixed interest rate) much more than that desk is facing a customer at a three percent fixed interest rate. This discrepancy is inherent in all derivatives desks because of their complex nature. This is not a simple one billion dollar bond or a one billion dollar stock.

Thus, according to the Volcker Rule, a financial entity cannot prop trade and in order to not prop trade on the market making desks the financial entity has to show that its trading desks are facing customers. The standard measurement stick used to measure market making derivatives desks does a good job, but there are inherent flaws that are addressed by the various aspects disclosed herein.

FIG. 1 illustrates an example, non-limiting system 100 configured to evaluate customer facing risk ratio (CFRR) performance, according to an aspect. Various aspects described herein relate to deriving a metric that measures customer facing risk exposure for trading desks of a financial entity that primarily transact in derivatives. The metric may be utilized to determine conformance to various regulations as it relates to derivative transactions. The CFRR may be utilized to measure the proportion of customer facing risk exposure compared to the total risk exposure for each trading desk of a financial entity.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the at least one memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 102 (e.g., operatively connected to the at least one memory 102), the various aspects are not limited to this implementation. Instead, in accordance with various implementations, the one or more computer executable components and/or the one or more computer executable instructions may be stored in (or integrated within) the at least one memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Also included in the system 100 may be a risk factor manager 106 that may be configured to identify a primary risk factor for each market making derivate desk for a financial entity. For example, each different type of trading desk may have a different primary risk driver. For example, a desk primarily trading in commodities may have a first primary risk driver, a desk primarily trading in equity derivatives may have a second primary risk driver, a desk primarily trading in municipal derivatives may have a third primary risk driver, and so on. Thus, each trading desk has an associated primary risk factor sensitivity.

The system 100 may also include a customer facing risk ratio manager 108 that may be configured to determine a value associated with how much a particular trading desk is customer facing. According to some implementations, the customer facing risk ratio manager 108 may be configured to determine the value based on calculating an absolute value of the risk attributable to customer transactions (financial exposure) divided by the absolute value of the total financial exposure. Thus, as expressed by the following equation, CFRR is equal to, $$\frac{\text{Absolute Value [Risk Attributable to Customer Transactions (Financial Exposure)]}}{\text{Absolute Value [Total Financial Exposure]}}$$

Based on the CFRR value, a determination may be made as to whether that trading desk conforms to the primary risk driver identified by the risk factor manager 106. If the desk does conform, the trading desk may continue to operate and perform financial transactions. However, if the desk does not conform, one or more operations may be modified, or, in some cases, the desk may be closed (e.g., dissolved) and no longer continue operations, may be folded into another trading desk, or another action may be performed.

An interface component 110 may be configured to output information related to the CFRR value as well as a corresponding CFTR value for each trading desk being analyzed. For example, the output may be in the form of a line chart, where a first line of the line chart is for the CFTR value and a second line of the line chart is for the CFRR value, wherein the first line and the second line are overlaid on each other so that a user may readily perceive the similarity and/or differences between the two values. However, it should be understood that another manner of expressing these values other than a line chart may be utilized with the disclosed aspects.

In accordance with some implementations, an alert may be output based on a determination that a particular trading desk is not adequately customer facing. Additionally or alternatively, based on the CFRR value, the system 100 may be configured to improve the functionality of a trading desk by automatically suspending or limiting trading at a particular trading desk.

According to some implementations, the interface component 110 (as well as other interface components discussed herein) may provide a graphical user interface (GUI), a command line interface, a speech interface, Natural Language text interface, and the like. For example, a Graphical User Interface (GUI) may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or Application Program Interface (API). In addition, the command line interface may be employed in connection with hardware (e.g., video cards) and/or displays (e.g., black and white, and Video Graphics Array (EGA)) with limited graphic support, and/or low bandwidth communication channels.

Figure 2:
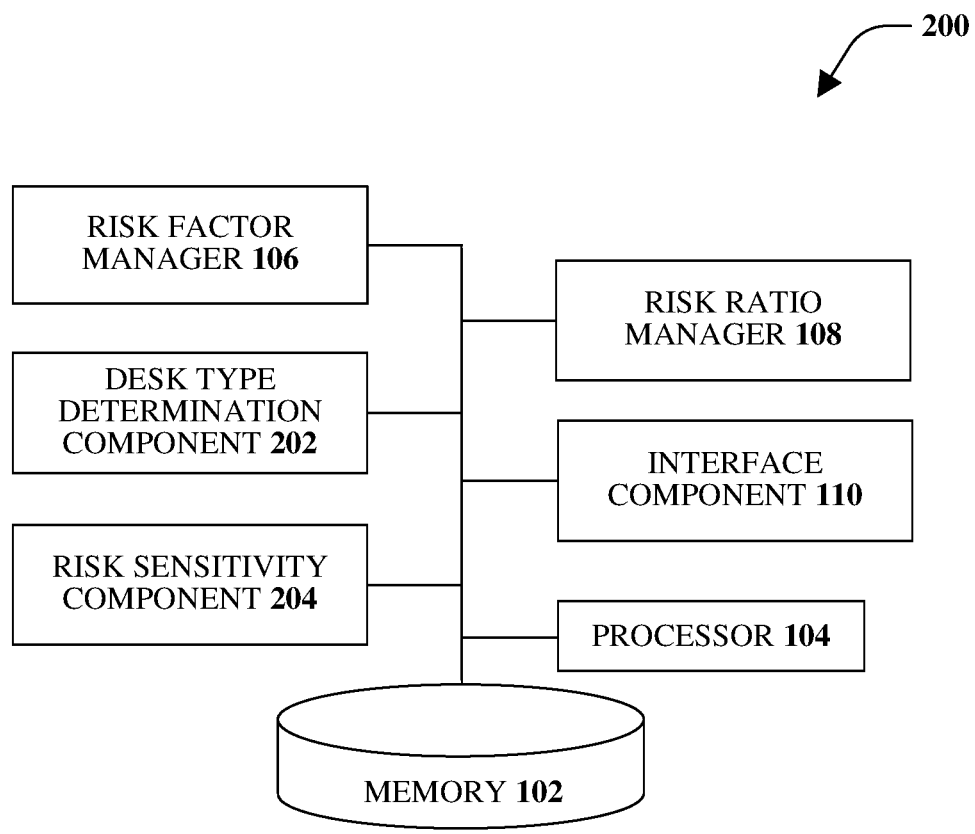
FIG. 2 illustrates an example non-limiting system for determining data measures associated with a customer facing risk ratio, according to an aspect.

FIG. 2 illustrates an example non-limiting system 200 for determining data measures associated with a customer facing risk ratio, according to an aspect. The respective customer facing risk ratio for each trading desk may be based on a key risk-factor per desk. Further, the respective customer facing risk ratio may be leveraged for a derivatives desk.

The system 200 may include a desk type determination component 202 that may be configured to associate each trading desk of a financial entity into an assigned category. Each trading desk at the financial entity may specialize in one type of security. Thus, the assigned category may be the primary purpose of the desk or its specialized security type. Examples of security types may include, but are not limited to stocks, bonds, commodities, BGS, derivatives, equity derivatives, municipal derivatives, institutional options, swaps, rates, short end rates, and so forth.

A risk sensitivity component 204 may be configured to determine a risk sensitivity level, or a primary risk driver for each trading desk that has been identified by the desk type determination component 202. According to some implementations, the risk sensitivity level may be a sensitivity level that is agreed upon across a financial industry or a subset thereof.

Below is an example non-limiting table that may be utilized by the risk sensitivity component 204 to determine the risk sensitivity level. At about the same time as receiving the identification of the trading desk by the desk type determination component 202, the risk sensitivity component 204 may cross-reference the desk type to its corresponding risk sensitivity.

| Desk | Primary Risk Driver Identified for Dashboard Purposes |
| --- | --- |
| Commodities | COMMODITY_DELTA_RFS |
| BGS | IR01 |
| Equity Derivatives | VEGA |
| Municipal Derivatives | IR01_DV01_RFS |
| Institutional Options | IR01_DV01_RFS |
| Swaps | IR01_DV01_RFS |
| Rates | IR01_DV01_RFS |
| Short End Rates | IR01_DV01_RFS |

According to the above example table, for an equity derivatives desk, the primary risk driver is VEGA, which is the measurement of the desk's sensitivity to changes in the volatility of the underlying asset. With further reference to the above table, for a rates desk, the primary risk driver is IR01 (interest rate 01), DV01 (change in present value of the swap for a one basis point parallel shift in the swap curve), and RFS (receiver (forward-start) interest rate swap). Although not discussed, there may be numerous other types of trading desks and/or primary risk drivers, according to various aspects.

Based upon the desk type and the risk sensitivity, the risk ratio manager 108 determines the customer facing risk ratio. For example, the risk ratio manager 108 may be configured to take the absolute value of the primary risk factor sensitivity for that derivatives desk that is customer facing and divide that value by the absolute value of the total exposure on that trading desk. The result of the calculation is a percentage value. Thus, if a trading desk has a CFRR of 50%, that indicates that 50% of the desk's risk is facing customers and 50% of the desk's risk is facing non-customers. A percentage above 50% indicates the desk is more customer facing than non-customer facing. However, a percentage below 50% indicates the desk is more non-customer facing than customer-facing, which may be a problem.

The information related to the CFRR for a single trading desk, or for multiple trading desks, may be output by the interface component 110. The output may be integrated as a dashboard and may allow a user to drill down into further details, as desired. A dashboard may be configured to track various values over time. For example, a dashboard for an identified trading desk may provide three values representing the CFTR of that desk at thirty, sixty, and ninety day increments. The dashboard for the identified trading desk may provide another three values, representing the CFRR of that desk for the same thirty, sixty, and ninety day increments.

Various personnel of the financial entity (or trusted third party) may utilize the information, which may be integrated into dashboards or other output information, as a tool to evaluate how well the financial entity is doing in terms of determining, according to the Volcker rule, whether a trading desk is trading with a customer and is not prop trading.

For example, a CFRR Graph may be included in Management Dashboards for the trading desks that are having this metric produced. The graph may be visually represented as a line graph and may mirror the time ranges of other graphs displayed on the dashboard. Although the graph has been discussed with respect to 30, 60, and 90 day periods, other time ranges may be utilized with the disclosed aspects. The representation allows regulators to determine how a trading desk is doing with respect to conformance to various regulations (e.g., governmental, organizational, and so on) over the respective time periods, which may be configurable time periods.

In an example, if the customer facing activity for a trading desk goes down sharply in a thirty day range, but looks good in other time ranges, it might indicate the trading desk is not trading with customers in short term, which could indicate the desk is prop trading. By having both the CFTR values and the CFRR values together, a comparison may be performed to determine how effectively a trading desk is customer facing. For example, if the CFTR for a trading desk does not look good, the personnel responsible for that desk might be worried about whether the desk is effectively facing customers. However, according to the various aspects presented herein, on same graph the CFRR is provided and the personnel responsible for the desk may determine that the desk is facing customers based on the primary risk factor sensitivity, which is more accurate than the CFTR values for a derivatives desk.

Figure 3:
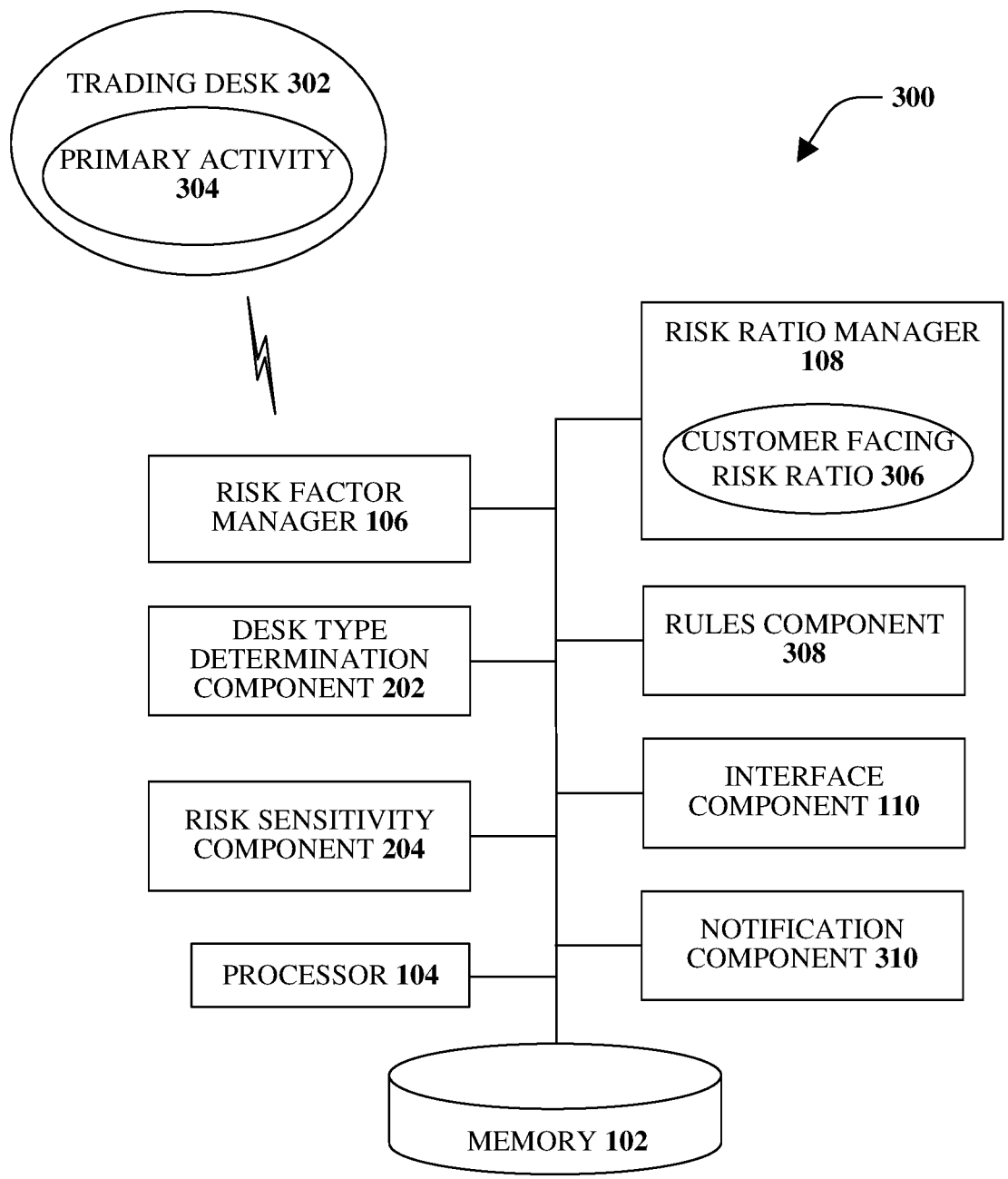
FIG. 3 illustrates an example non-limiting implementation of a system configured to provide information related to a customer facing risk ratio for a trading desk, according to an aspect.

FIG. 3 illustrates an example non-limiting implementation of a system 300 configured to provide information related to a customer facing risk ratio for a trading desk, according to an aspect. According to various United States government regulations, trading desks associated with a financial entity should not engage in prop trading. Instead, the trading desks should engage in financial transactions that are customer facing. Although current government reporting requirements work well for their intended purpose, in the case of trading desks that engage in derivatives, the results of the reporting requirements may be misleading and might not adequately reflect the percentage of customer trading transactions accurately.

Instead of using trade counts and/or notional values, the disclosed aspects evaluate at least one trading desk 302 with respect to the type of activity 304 that the trading desk 302 is primarily engaged in, such as bonds, commodities, currencies, interest rates, market indexes, stocks, or other derivatives. Although illustrated as a single trading desk 302 and its associated primary activity 304, the disclosed aspects may have more than one trading desk 302, each of which is engaged with different primary activities.

The risk factor manager 106 may be configured to identify a primary risk factor for the trading desk 302 based upon its primary activity 304. For example, the risk factor manager 106 may be configured to receive information related to the trading desk 302. According to some implementations, the information related to the trading desk 302 may be known a priori, wherein details related to each trading desk being reviewed are determined prior to information related to each trading desk being retrieved.

The desk type determination component 202 may be configured to classify the trading desk 302 into an assigned category based on its primary activity 304. Based on this information, the risk sensitivity component 204 may be configured to determine a risk sensitivity level for the trading desk. This information may be retained in a database associated with the risk factor manager 106, in the memory 102, or in another system 300 component. According to some implementations, the information may be retained external to the system 300, wherein the system 300 accesses the external source as needed (e.g., dynamically).

The risk ratio manager 108 may be configured to determine a customer facing risk ratio 306 associated with the trading desk 302. The determination by the risk ratio manager 108 may be ascertained by dividing the absolute value of the risk attributable to customer transactions (financial exposure) divided by the absolute value of the total financial exposure.

A rules component 308 may be configured to determine if the trading desk 302 is appropriately customer facing, or if the trading desk 302 is non-customer facing and different actions may be taken based upon the determination. According to an implementation, if the resulting customer facing risk ratio 306 is at or above a threshold level, it may indicate the trading desk 302 is customer facing. In this case, the rules component 308 may determine that no action needs to be taken, other than recording the resulting customer facing risk ratio 306. However, if the resulting customer facing risk ratio 306 is less than the threshold level, it may indicate the trading desk 302 is non-customer facing and action may need to be taken. The threshold level may be established by each financial entity based on its desired exposure for customers. According to some implementations, the threshold level may be fifty-percent, however, another percentages may be utilized.

According to some implementations, if the determination by the rules component 308 is that trading desk 302 is mostly non-customer facing, a notification component 310 may output an alert to one or more devices. For example, a rule or policy may be established to alert personnel responsible for the trading desk, management, or other personnel within the organization. The alert may be output by the notification component 310 through various manners including email, text messages, telephone calls, and so on. Further, the notification component 310 may output the alert to one or more devices at substantially the same time, or at different times. Further, the type of alerts output may be different depending on the device type, user preferences, or based on other considerations.

A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

The interface component 110 may provide information related to the determined customer facing risk ratio 306 as well as other data. Such other data may include a CFTR for the trading desk, the determined type of trading desk, the primary activity utilized to make the determination, the risk sensitivity utilized for the calculation, and so on.

According to some implementations, for the purposes of the customer facing risk ratio determination, risk attributable to customer transactions might include inter-desk transactions as customer-facing transactions. Additionally or alternatively, inter-affiliate trades that are not inter-desk trades may be included as both customer-facing transactions and the "Total Financial Exposure" calculation (denominator of the above equation). Further to this implementation, inter-desk trades may be identified based on the counterparty on the trade being attributed to a valid inventory in an inventory master.

Figure 4:
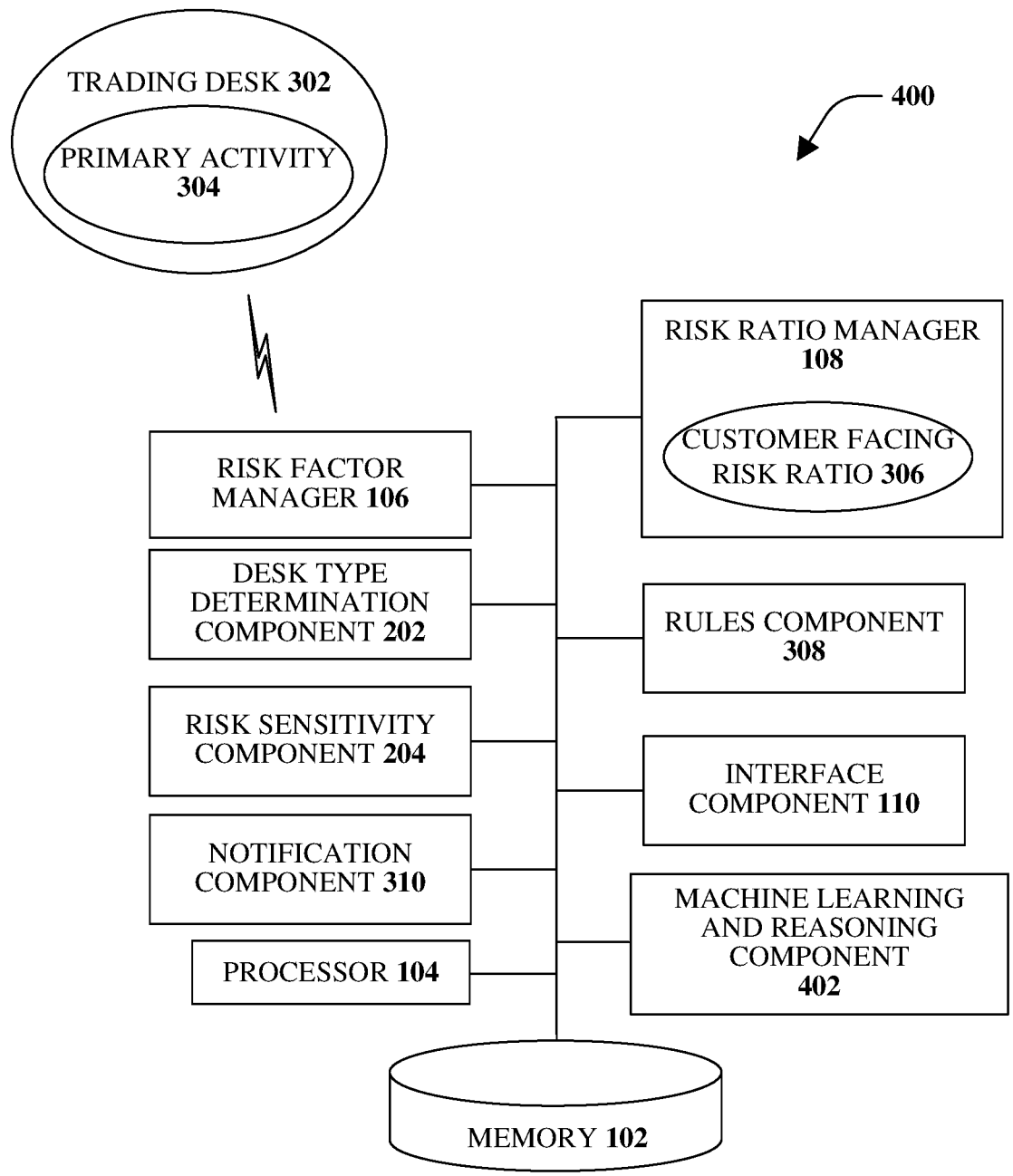
FIG. 4 illustrates an example, non-limiting system that employs automated learning to facilitate one or more of the disclosed aspects.

FIG. 4 illustrates an example, non-limiting system 400 that employs automated learning to facilitate one or more of the disclosed aspects. For example, a machine learning and reasoning component 402 may be utilized to automate one or more of the disclosed aspects. The machine learning and reasoning component 402 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 402 may employ principles of probabilistic and decision theoretic inference. Additionally or alternatively, the machine learning and reasoning component 402 may rely on predictive models constructed using machine learning and/or automated learning procedures. Logic-centric inference may also be employed separately or in conjunction with probabilistic methods.

The machine learning and reasoning component 402 may infer a primary purpose of a trading desk, a security risk level applied to the trading desk, whether inter-desk and/or inter-affiliate transactions should be included in a customer facing risk ratio transaction, and so on. Based on this knowledge, the machine learning and reasoning component 402 may make an inference based on information available for a trading desk, historical information associated with the trading desk, and so on.

As used herein, the term "inference" refers generally to the process of reasoning about or inferring states of the system, a component, a module, the environment, and/or customers (or devices associated with the customers) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with determining respective customer facing risk ratio for trading desks in real-time) may employ various artificial intelligence-based schemes for carrying out various aspects thereof. For example, a process for determining a severity risk level to apply to a trading desk, transactions to include in a customer facing risk ratio calculation, and so on, may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine what trading desks should be reviewed, which transactions to include in a risk ratio calculation, whether to output an alert regarding a particular trading desk, and so on. In the case of customer facing risk ratio, for example, attributes may be keywords or phrases in a description of a trading desk and the classes may be identification of a risk sensitivity level based on a primary purpose of the description of the trading desk.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing user behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria which transactions may be included in a risk ratio calculation, when to perform a risk ratio calculation, whether to output a notification or other alert, whether a trading desk conforms to an established set of rules, and so forth. The criteria may include, but is not limited to, similar transactions, historical information, current information, transaction attributes, and so forth.

Additionally or alternatively, an implementation scheme (e.g., a rule, a policy, and so on) may be applied to control and/or regulate which transactions are considered to be customer facing and which transactions are considered to be non-customer facing. In some implementations, based upon a predefined criterion, the rules-based implementation may automatically and/or dynamically interpret attributes associated with each transaction. In response thereto, the rule-based implementation may automatically interpret and carry out functions associated with the transactions by employing a predefined and/or programmed rule(s) based upon any desired criteria.

Methods that may be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
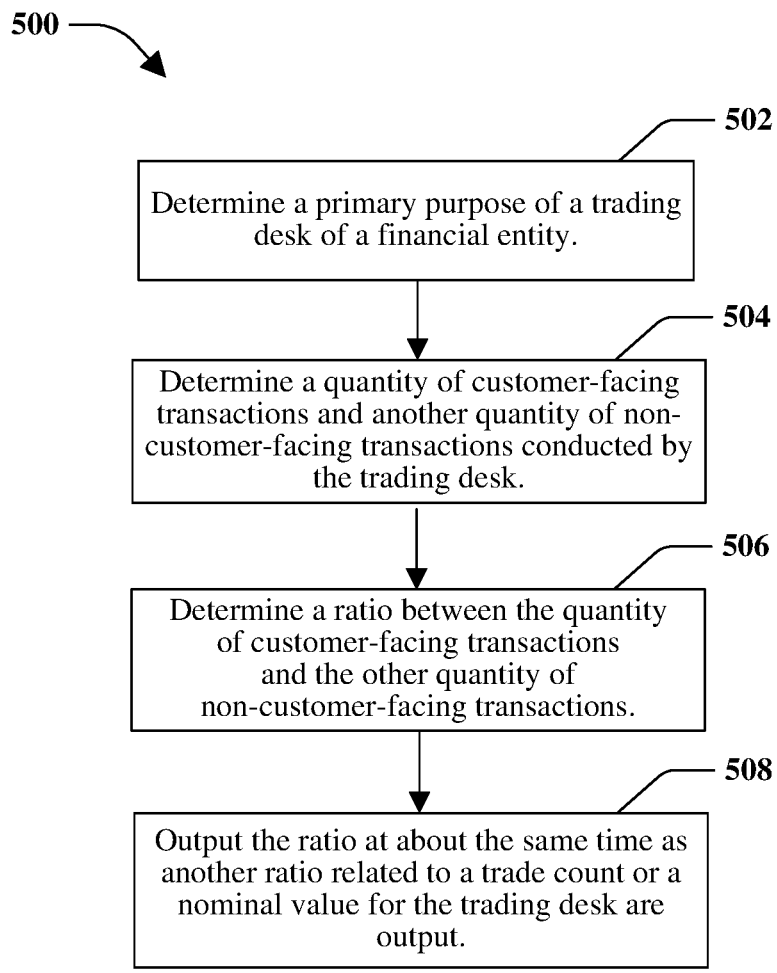
FIG. 5 illustrates an example, non-limiting method for determining a customer facing risk ratio for trading desks associated with a financial entity, according to an aspect.

FIG. 5 illustrates an example, non-limiting method 500 for determining a customer facing risk ratio for trading desks associated with a financial entity, according to an aspect. The method 500 in FIG. 5 may be implemented using, for example, any of the systems, such as the system 200 (of FIG. 2), described herein.

The method 500 starts at 502 when a primary purpose of a trading desk is determined. The trading desk could be one trading desk of a set of trading desks associated with a financial entity. The trading desk may be selected based on various factors including a manual selection by a manager for the trading desk, a scheduled review, a random review, and so on. The selected trading desk may be a trading desk that handles the marketing of securities, derivatives, or another form of market making revenue.

At 504, a quantity of customer-facing transactions conducted by the trading desk and another quantity of non-customer-facing transactions conducted by the trading desk are determined. This determination may be made based on various criteria including monitoring the transaction performed by the trading desk. Such monitoring may be performed continuously, periodically, randomly, or based on other times.

A ratio between the quantity of customer-facing transactions and the other quantity of non-customer-facing transactions is determined at 506. The ratio may be based in part on a risk sensitivity level that is a function of the primary purpose of the trading desk. For example, each trading desk associated with the financial entity may have a different primary purpose (e.g., trade in stocks, trade in bonds, trade in commodities, trade in futures, and so on) and each primary purpose has a risk sensitivity level. This risk sensitivity level may be determined a priori and may be contained in a cross-reference table, a database, or another manner or corresponding the primary purpose to of the trading desk to the risk sensitivity level.

At 508, the ratio for the trading desk is output at about the same time as a ratio related to a trade count or a nominal value for the trading desk are output. For example, the ratio information for the trading desk may be output to one or more devices that have been identified to receive the information (e.g., a manager of the trading desk, a manager of a set of trading desks, a regulating authority, and so on). The ratio may be output in manner that one or more time frames may be analyzed and compared to other information associated with the trading desk.

Figure 6:
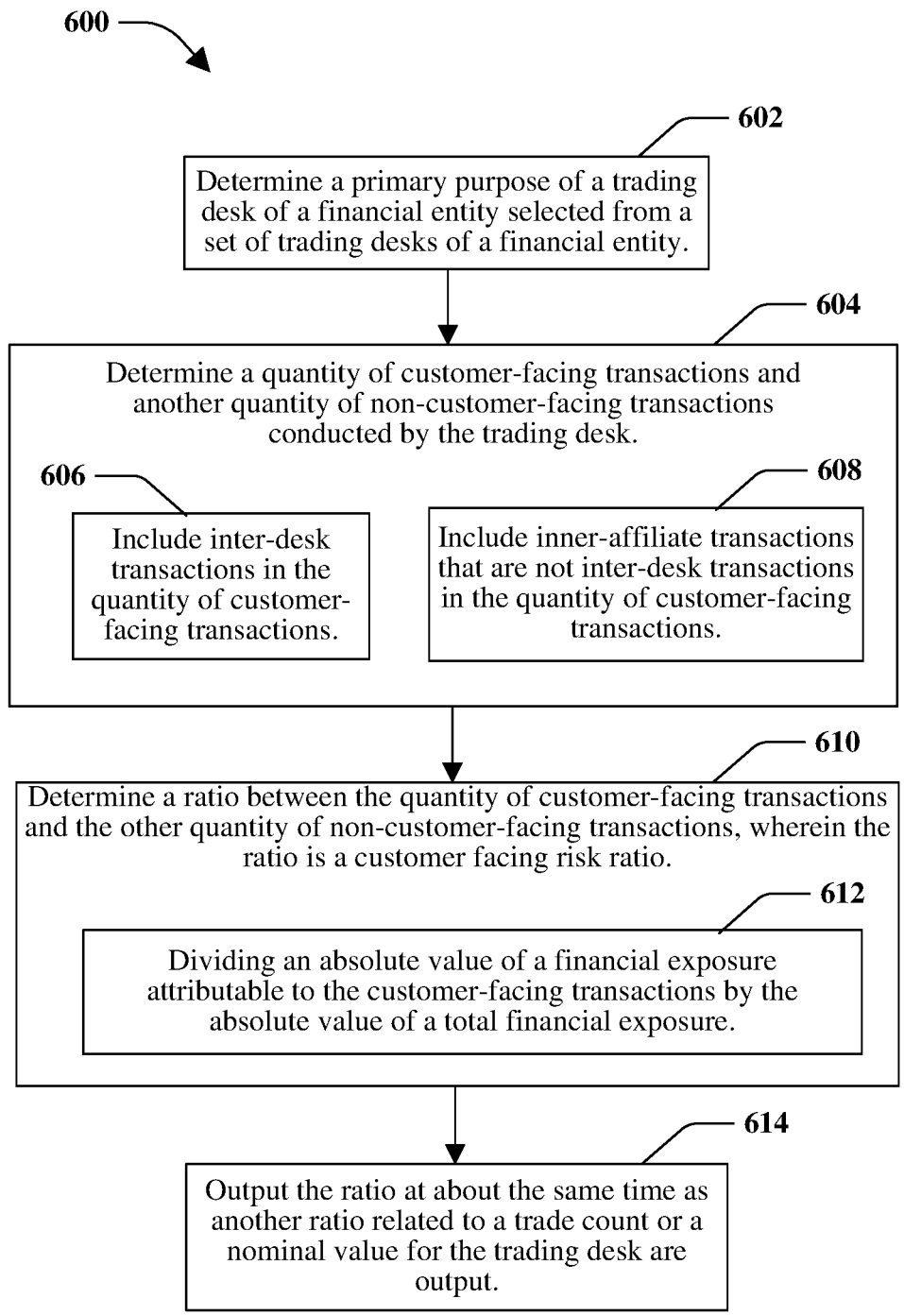
FIG. 6 illustrates an example, non-limiting method for determining a customer facing risk ratio for trading desks associated with a financial entity, according to an aspect.

FIG. 6 illustrates an example, non-limiting method 600 for determining a customer facing risk ratio for trading desks associated with a financial entity, according to an aspect. The method 600 in FIG. 6 may be implemented using, for example, any of the systems, such as the system 300 (of FIG. 3), described herein.

At 602, a primary purpose of a trading desk of a financial entity selected from a set of trading desks of a financial entity is determined. For example, the financial entity may include a set of trading desks (e.g., two trading desks, seven trading desks, twenty-five trading desks, sixty trading desks, one hundred and four trading desks, and so on). A first trading desk of those trading desks is selected for analysis. After the analysis is performed on the first trading desk, a second trading desk may be selected for analysis, and so on.

For the selected trading desk, a quantity of customer-facing transactions is determined, at 604. Further, at 604, another quantity of non-customer-facing transactions conducted by the selected trading desk is determined. The quantity of customer-facing transactions and the other quantity of non-customer facing transaction may be for a defined time range (e.g., one day, one week, one month, a quarter, and so on).

According to some implementations, at 606, inter-desk transactions may be included in the customer-facing transactions. In additional or alternative implementations, at 608, inter-desk transactions may be included in the customer-facing transactions. The determination of which transactions are inter-desk transactions may be based on a counterparty on the trade being attributed to a valid inventory in an inventory master.

At 610, a ratio between the quantity of customer-facing transactions and the other quantity of non-customer-facing transactions is determined. The ratio may be expressed as a customer facing risk ratio. According to an implementation, determining the ratio may include, at 612, dividing an absolute value of a financial exposure attributable to the customer-facing transactions by the absolute value of a total financial exposure. The total financial exposure may include a combination of the financial exposure attributable to the customer-facing transactions and the financial exposure attributable to the non-customer transactions.

The method 600 continues, at 614, when the ratio is output at about the same time as another ratio related to a trade count or a nominal value for the trading desk are output. The trade count or the nominal value may be a customer-facing trade ratio. Outputting the ratio may include overlaying the ratio on the customer-facing trade ratio based upon a similar time range (e.g., a 30-day period, a 60-day period, a 90-day period, and so on).

Figure 7:
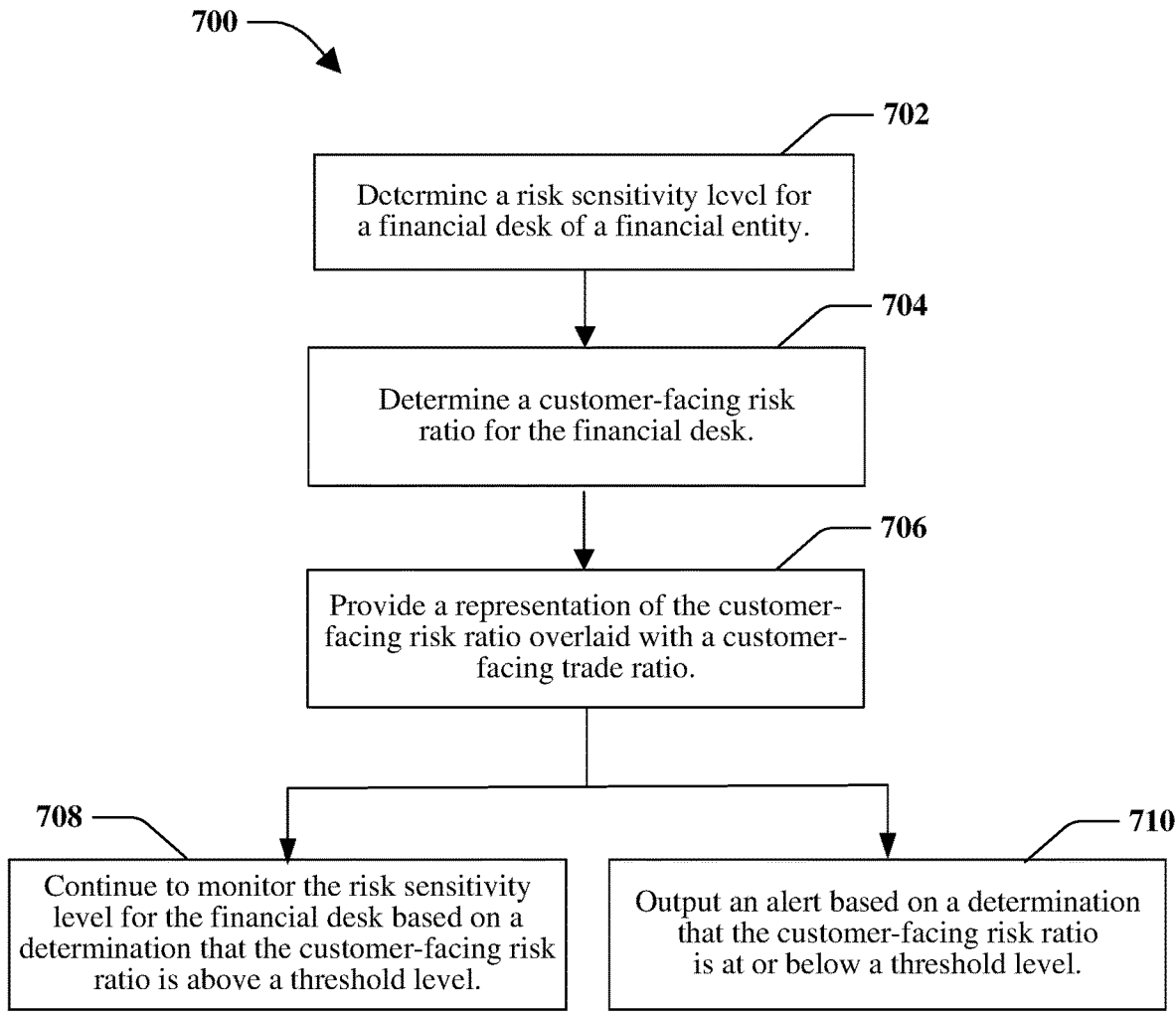
FIG. 7 illustrates an example, non-limiting method for automatically implementing one or more actions based on a set of rules for a customer facing risk ratio determination, according to an aspect.

FIG. 7 illustrates an example, non-limiting method 700 for automatically implementing one or more actions based on a set of rules for a customer facing risk ratio determination, according to an aspect. The method 700 in FIG. 7 may be implemented using, for example, any of the systems, such as the system 400 (of FIG. 4), described herein.

At 702, a risk sensitivity level for a financial desk of a financial entity is determined. The financial desk may have a primary purpose of marketing is derivatives. The risk sensitivity level may be determined based on a category of derivative with which the financial desk is engaged.

A customer-facing risk ratio for the financial desk is determined, at 704. The determination may be made based on a comparison between a risk attributable to customer transactions and a total financial exposure. In accordance with an implementation, the customer-facing risk ratio may be determined by dividing an absolute value of a financial exposure attributable to customer transactions by the absolute value of the total financial exposure. The total financial exposure may include a combination of the financial exposure attributable to customer transactions and the financial exposure attributable to non-customer transactions.

According to some implementations, the determination is made according to the following equation:

$$\frac{\text{Absolute Value [Risk Attributable to Customer Transactions (Financial Exposure)]}}{\text{Absolute Value [Total Financial Exposure]}}$$

At 706, a representation of the customer-facing risk ratio is output in a perceivable format. According to some implementations, the customer-facing risk ratio is visually overlaid with a customer-facing trade ratio. For example, the customer-facing trade ratio and the customer-facing risk ratio may be output in the form of a line chart or bar chart, wherein a comparison between the two ratios may be readily perceived.

Based on a determination that the customer-facing risk ratio is at or above a threshold level, at 708, the risk sensitivity level for the financial desk is continued to be monitored. Alternatively, based on another determination that the customer-facing risk ratio is at or below the threshold level an alert may be output. For example, the alert may be output to one or more identified devices such that key personnel of the financial entity are provided information related to the potential non-conformance of the Volcker Rule or other government regulation.

Figure 8:
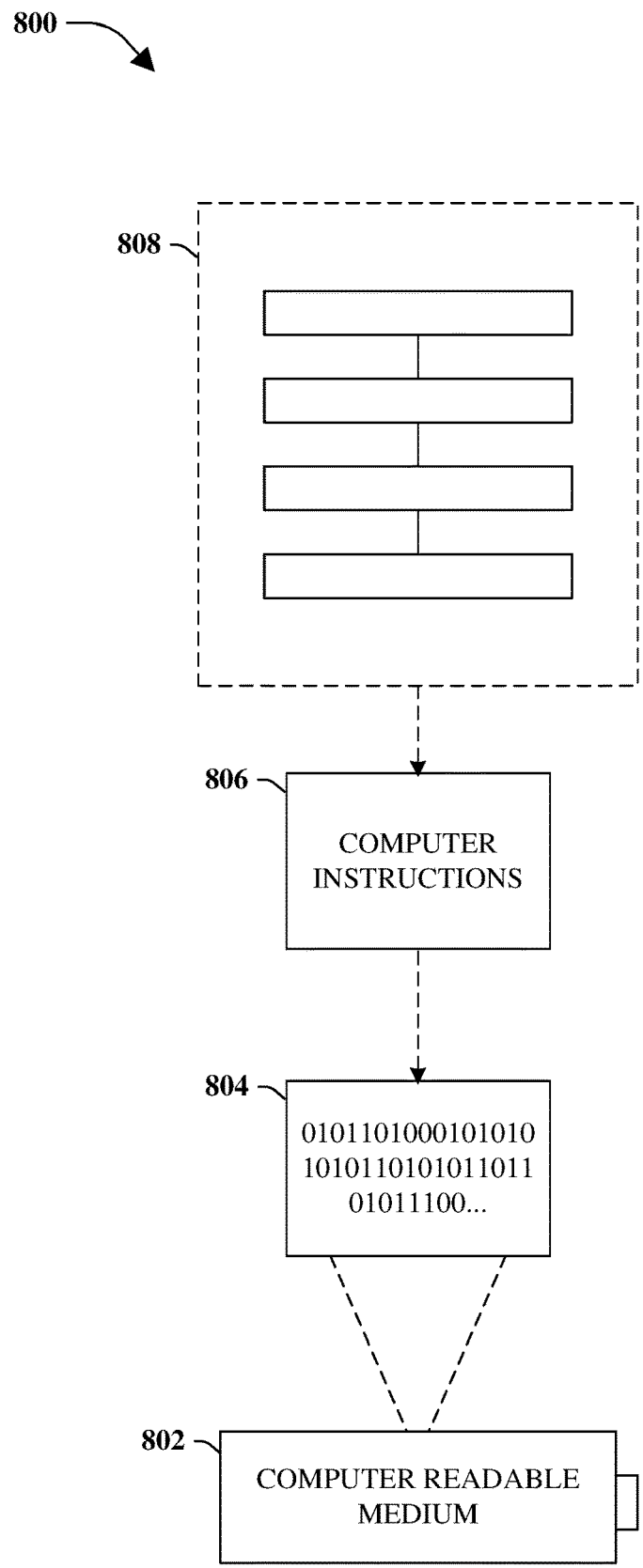
FIG. 8 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects enable identification of anomalous transaction attributes in real-time with adaptive threshold tuning. An embodiment of a computer-readable medium or a computer-readable device devised in these ways is illustrated in FIG. 8, wherein an implementation 800 includes a computer-readable medium 802, such as a CD-R, DVD-R, flash drive, a platter of a hard disk drive, and so forth, on which is encoded computer-readable data 804. The computer-readable data 804, such as binary data including a plurality of zero's and one's as illustrated, in turn includes a set of computer instructions 806 configured to operate according to one or more of the principles set forth herein.

In the illustrated embodiment 800, the set of computer instructions 806 (e.g., processor-executable computer instructions) may be configured to perform a method 808, such as the method 500 of FIG. 5 and/or the method 700 of FIG. 7, for example. In another embodiment, the set of computer instructions 806 may be configured to implement a system, such as the system 100 of FIG. 1 and/or the system 400 of FIG. 4, for example. Many such computer-readable media may be devised by those of ordinary skill in the art that are configured to operate in accordance with the techniques presented herein.

As used in this application, the terms "component", "module," "system", "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 8 and the following discussion provide a description of a suitable computing environment to implement embodiments of one or more of the aspects set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 9:
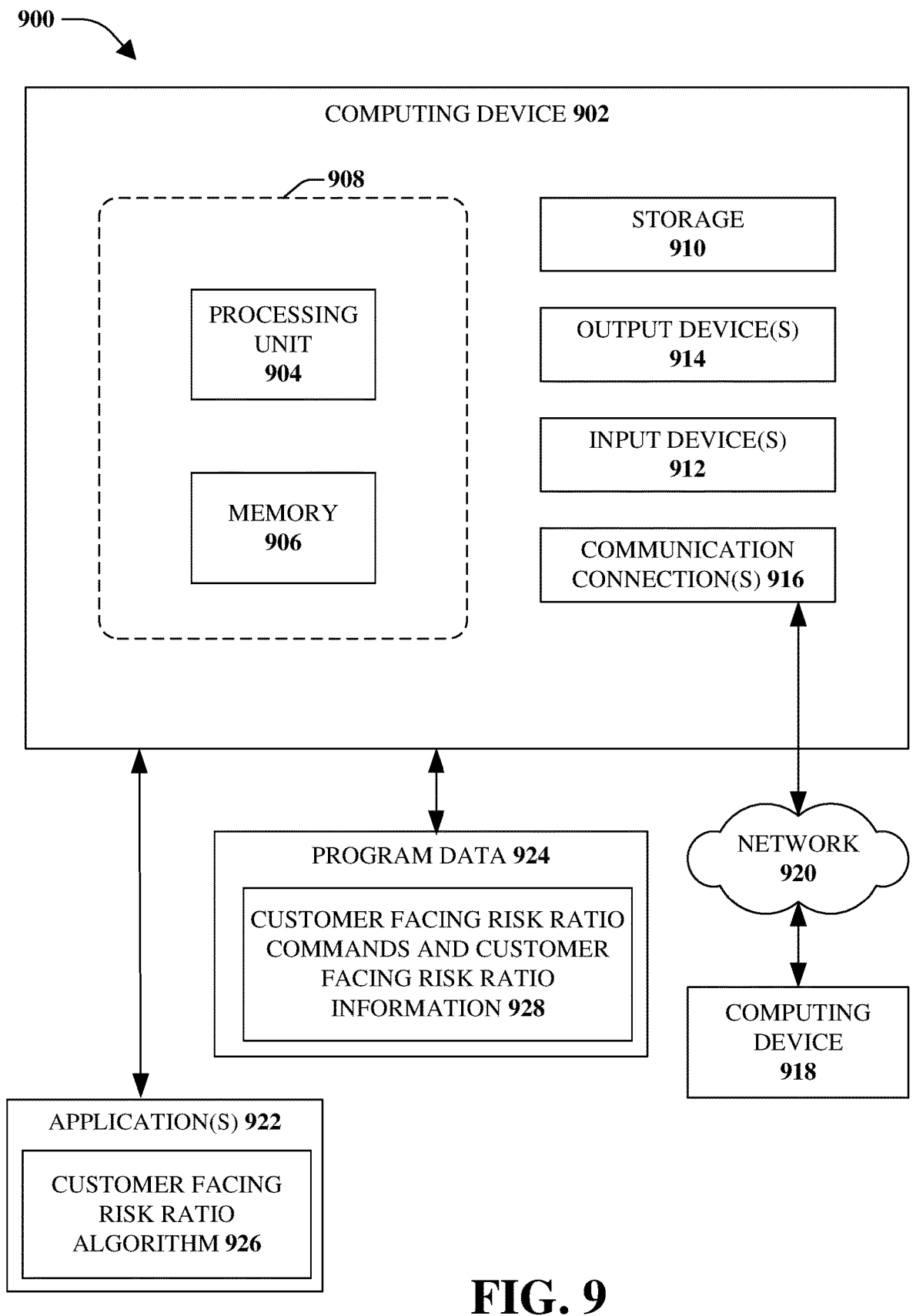
FIG. 9 illustrates an example, non-limiting computing environment where one or more of the aspects set forth herein are implemented, according to one or more aspects.

FIG. 9 illustrates a system 900 that may include a computing device 902 configured to implement one or more embodiments provided herein. In one configuration, the computing device 902 may include at least one processing unit 904 and at least one memory 906. Depending on the exact configuration and type of computing device, the at least one memory 906 may be volatile, such as RAM, non-volatile, such as ROM, flash memory, etc., or a combination thereof. This configuration is illustrated in FIG. 9 by dashed line 908.

In other embodiments, the computing device 902 may include additional features or functionality. For example, the computing device 902 may include additional storage such as removable storage or non-removable storage, including, but not limited to, magnetic storage, optical storage, etc. Such additional storage is illustrated in FIG. 9 by storage 910. In one or more embodiments, computer readable instructions to implement one or more embodiments provided herein are in the storage 910. The storage 910 may store other computer readable instructions to implement an operating system, an application program, etc. Computer readable instructions may be loaded in the at least one memory 906 for execution by the at least one processing unit 904, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 902 may include input device(s) 912 such as keyboard, mouse, pen, voice input device, touch input device, infrared cameras, video input devices, or any other input device. Output device(s) 914 such as one or more displays, speakers, printers, or any other output device may be included with the computing device 902. The input device(s) 912 and the output device(s) 914 may be connected to the computing device 902 via a wired connection, wireless connection, or any combination thereof. In one or more embodiments, an input device or an output device from another computing device may be used as the input device(s) 912 and/or the output device(s) 914 for the computing device 902. Further, the computing device 902 may include communication connection(s) 916 to facilitate communications with one or more other devices, illustrated as a computing device 918 coupled over a network 920.

One or more applications 922 and/or program data 924 may be accessible by the computing device 902. According to some implementations, the application(s) 922 and/or program data 924 are included, at least in part, in the computing device 902. The application(s) 922 may include a customer facing risk ratio algorithm 926 that is arranged to perform the functions as described herein including those described with respect to the system 300 of FIG. 3. The program data 924 may include customer facing risk ratio commands and customer facing risk ratio information 928 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A computing system configured to determine a customer-facing risk ratio, comprising:
 a processor coupled to a memory that stores instructions that when executed by the processor cause the processor to:
  configure a risk factor manager that determines a risk driver for a financial desk, wherein the risk driver is based on a type of transaction engaged by the financial desk;
  configure a risk ratio manager that determines a ratio of transactions processed by the financial desk based on the risk driver and a comparison between customer-facing transactions and non-customer-facing transactions;
  configure a rules component that compares the ratio of transactions with a threshold level to determine whether the financial desk is customer-facing or non-customer-facing; and
  configure a notification component that, responsive to the rules component determining that the financial desk is non-customer-facing, provides output data to an additional computing device, wherein the output data performs one or more of:
   i. configuring a dashboard that displays a line chart representing the ratio of transactions,
   ii. providing an alert describing the financial desk, or
   iii. modifying subsequent transaction engagement by the financial desk,
  wherein the risk factor manager, the risk ratio manager, the rules component, and the notification component are implemented within the computing system configured to determine the customer-facing risk ratio.

2. The computing system of claim 1, wherein a first line of the line chart represents a Customer Facing Trade Ratio (CFTR) value and a second line of the line chart represents a Customer Facing Risk Ratio (CFRR) value.

3. The computing system of claim 2, wherein the instructions further cause the dashboard to display the CFTR and the CFRR in thirty, sixty, or ninety day increments.

4. The computing system of claim 2, wherein the instructions further cause the dashboard to display the CFTR and the CFRR in configurable time periods.

5. The computing system of claim 1, wherein the instructions further:
 configure the dashboard to generate an additional representation based on trade count or notional value; and
 configure the dashboard to display the additional representation aligned with the representation of the ratio of transactions.

6. The computing system of claim 5, wherein the trade count represents a number of trades with customers as compared to another number of trades with non-customers.

7. The computing system of claim 5, wherein the notional value represents a dollar amount of customer-facing trades as compared to another dollar amount of non-customer-facing trades.

8. The computing system of claim 5, wherein the trade count or the notional value comprise a customer-facing trade ratio.

9. The computing system of claim 1, wherein the instructions further cause the risk ratio manager to determine the ratio of transactions based on inter-desk transactions as a portion of the customer-facing transactions.

10. The computing system of claim 9, wherein the instructions further configure the risk ratio manager to identify the inter-desk transactions based on a counterparty on a trade being attributed to a valid inventory in an inventory master.

11. The computing system of claim 1, wherein the instructions further configure the risk ratio manager to determine the ratio of transactions is above an additional threshold level; and
    configure a machine learning and reasoning component that schedules a next period for review of the financial desk.

12. The computing system of claim 1, wherein the instructions further configure the risk ratio manager to determine the ratio of transactions is below an additional threshold level; and
    configure the dashboard to display an additional alert regarding the ratio of transactions.

13. A method, comprising:
    executing, on a processor coupled to a memory, instructions that cause the processor to perform operations comprising:
    configuring a risk factor manager that determines a risk driver for a financial desk, wherein the risk driver is based on a type of transaction engaged by the financial desk;
    configuring a risk ratio manager that determines a ratio of transactions processed by the financial desk based on the risk driver and a comparison between customer-facing transactions and non-customer-facing transactions;
    configuring a rules component that compares the ratio of transactions with a threshold level to determine whether the financial desk is customer-facing or non-customer-facing; and
    configuring a notification component that, responsive to the rules component determining that the financial desk is non-customer-facing, provides output data to an additional computing device, wherein the output data performs one or more of:
      i. configuring a dashboard that displays a line chart representing the ratio of transactions,
      ii. providing an alert describing the financial desk, or
      iii. modifying subsequent transaction engagement by the financial desk,
    wherein the risk factor manager, the risk ratio manager, the rules component, and the notification component are implemented within a computing system that includes the processor and the memory and is configured to perform the method.

14. The method of claim 13, wherein a first line of the line chart represents a Customer Facing Trade Ratio (CFTR) value and a second line of the line chart represents a Customer Facing Risk Ratio (CFRR) value.

15. The method of claim 14, wherein the instructions further cause the processor to perform operations comprising: configuring the dashboard to display the CFTR and the CFRR in thirty, sixty, or ninety day increments.

16. The method of claim 14, wherein the instructions further cause the processor to perform operations comprising: configuring the dashboard to display the CFTR and the CFRR in configurable time periods.

17. The method of claim 13, wherein determining the ratio of transactions comprises including inter-desk transactions in the customer-facing transactions.

18. The method of claim 17, the operations further comprising configuring the risk ratio manager to identify the inter-desk transactions based on a counterparty on a trade being attributed to a valid inventory in an inventory master.

19. The method of claim 13, wherein determining the ratio of transactions comprises including, in the customer-facing transactions, inter-affiliate transactions that are not inter-desk transactions.

20. The method of claim 13, the operations further comprising configuring the dashboard to overlay the representation of the ratio of transactions on an additional representation of a customer-facing trade ratio based on similar time ranges.

\* \* \* \* \*